United States Patent [19]
Van Winkler

[11] 3,749,938
[45] July 31, 1973

[54] CAPACITANCE FUNCTION GENERATOR

[76] Inventor: Vernon Van Winkler, 35 Waverly Rd., Cherry Hill, N.J. 08034

[22] Filed: Jan. 25, 1972

[21] Appl. No.: 220,636

[52] U.S. Cl. ............ 307/227, 307/261, 307/252 W, 328/186
[51] Int. Cl. ............................................ H03k 4/02
[58] Field of Search .................... 307/227, 228, 261, 307/264, 268, 252 W; 328/186

[56] References Cited

UNITED STATES PATENTS

| | | | |
|---|---|---|---|
| 3,058,012 | 10/1962 | Harling | 328/186 X |
| 3,261,990 | 7/1966 | Huang | 307/227 |

*Primary Examiner*—John Zazworsky
*Attorney*—Arthur H. Seidel et al.

[57] ABSTRACT

A capacitance function generator in which the portion of the charge on a first capacitor is transferred to a second capacitor by means of a solid state switching device. The solid state switching device may be a controlled rectifier. The charge on the first capacitor may be a linearly increasing charge supplied by a constant current generator. The controlled rectifier may be triggered periodically to produce a plurality of voltage levels across the second capacitor, each successive voltage level being greater in magnitude.

4 Claims, 3 Drawing Figures

CAPACITANCE FUNCTION GENERATOR

DISCLOSURE

This invention relates to a capacitance function generator. More particularly, the present invention relates to a capacitance function generator in which a portion of the charge on a first capacitor is applied to a second capacitor through a solid state switching device.

The capacitance function generator of the present invention may be used in numerous applications where it is desired to generate a plurality of voltage levels. In one embodiment, a plurality of voltage levels are generated with each succeeding voltage level being greater in magnitude than the previous level. However, levels of decreasing magnitude may be obtained by passing the signal through an inverting amplifier. Also, signals having a decreasing absolute magnitude may be obtained by subtracting the output signal of increasing magnitude from a constant voltage level.

The present invention may be used in various types of devices including transistor checkers and other types of test equipment used in analog computers. In transistor type test equipment, a plurality of increasing voltage levels is applied to the transistor in order to test its operation at various operating levels.

In one embodiment of the present invention, the output of the apparatus is a wave function which is commonly referred to as a staircase wave function. In this sense, the apparatus of the present invention may be termed a function generator. However, a plurality of such staircase wave function generators may be used in order to provide various other wave functions by adding or subtracting their outputs from one another.

In accordance with the present invention, a first capacitor is charged, and a portion of this charge is applied to a second capacitor through a solid state switch when a trigger pulse is applied to a triggering electrode of the solid state switch. The output voltage is taken across the second capacitor. In another embodiment, a first capacitor is charged by means of a constant current source. A portion of this charge on the first capacitor is transferred to a second capacitor through a solid state switch in response to triggering pulses being applied to the trigger electrode of the solid state switch at predetermined intervals.

For the purpose of illustrating the invention, there are shown in the drawings forms which are presently preferred; it being understood, however, that this invention is not limited to the precise arrangements and instrumentalities shown.

Figures 1, 2:
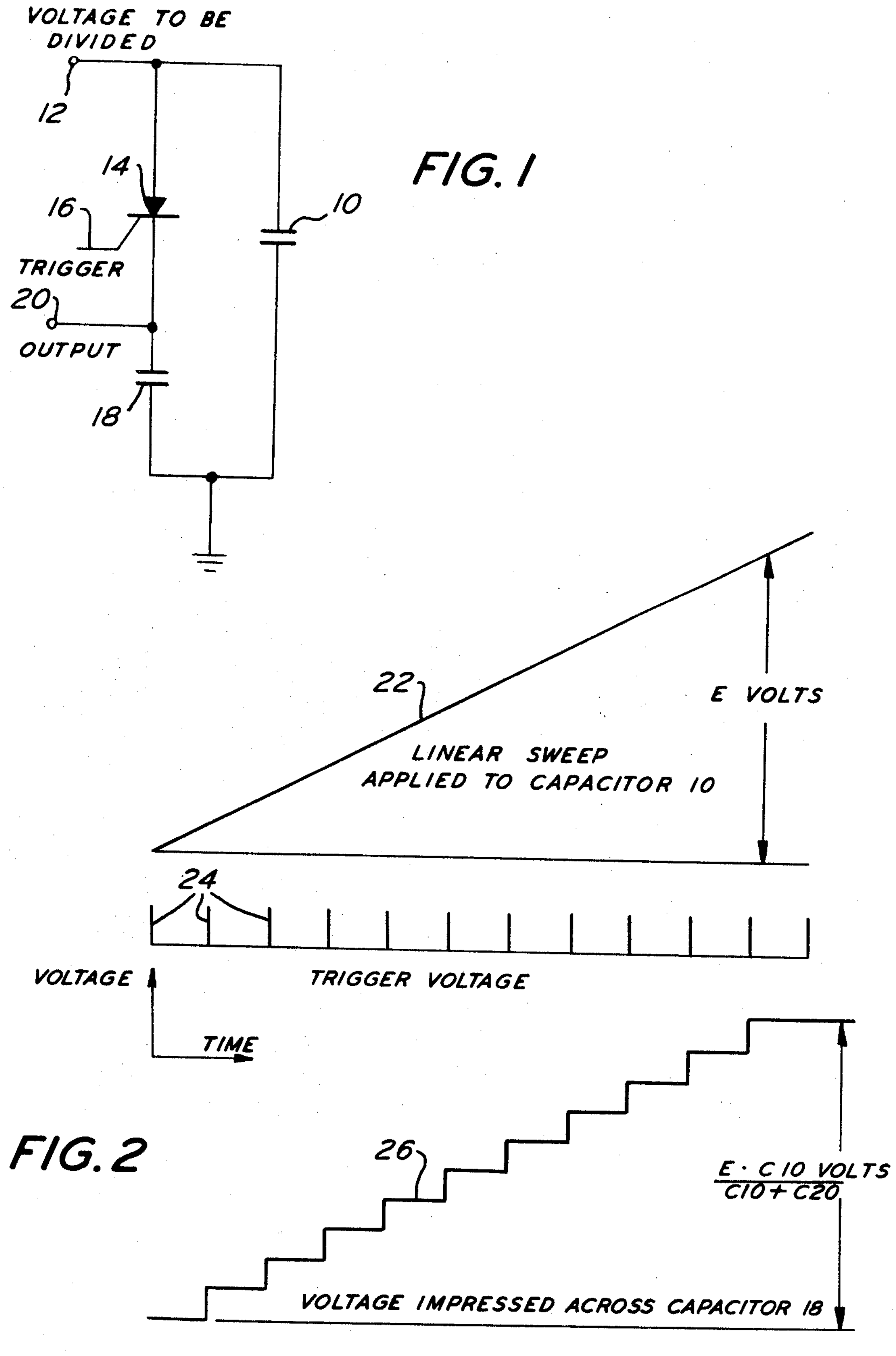
FIG. 1 is a schematic diagram of an apparatus in accordance with the present invention.
FIG. 2 is a drawing of wave forms in accordance with the present invention.

Referring now to the drawings in detail, there is shown in FIG. 1 a capacitor 10 connected between input terminal 12 and ground. A solid state switching device 14, having a trigger electrode 16, is connected in series with capacitor 18 across capacitor 10. The output voltage may be taken across capacitor 18 by means of connections to output terminal 20 and ground.

In operation, a voltage may be applied across capacitor 10 by applying a voltage between input terminal 12 and ground. After the voltage has been applied across input terminal 12 and ground for a sufficint period of time, capacitor 10 becomes charged to the voltage across input terminal 12 and ground. After the input voltage across terminal 12 and ground is removed, if a trigger pulse is applied to trigger electrode 16 of solid state switching device 14, capacitor 10 partially discharges through solid state switching device 14 and capacitor 18. Solid state switching device 14 may be a controlled rectifier which is turned on by a pulse applied to trigger electrode 16 and is turned off when the current through the anode-cathode circuit of the controlled rectifier ceases. The voltage appearing across capacitor 18 is proportional to the capacitance of capacitor 10 and inversely proportional to the sum of capacitances of capacitors 10 and 18.

Referring now to FIG. 2, there is shown a linear sweep voltage 22 which may be applied across input terminal 12 and ground of FIG. 1. There is shown along the same time base a series of trigger pulses 24 which may be applied to trigger electrode 16 of solid state switching device or controlled rectifier 14. The output voltage appearing across capacitor 18 would be the staircase wave form 26 shown in FIG. 2.

Figure 3:
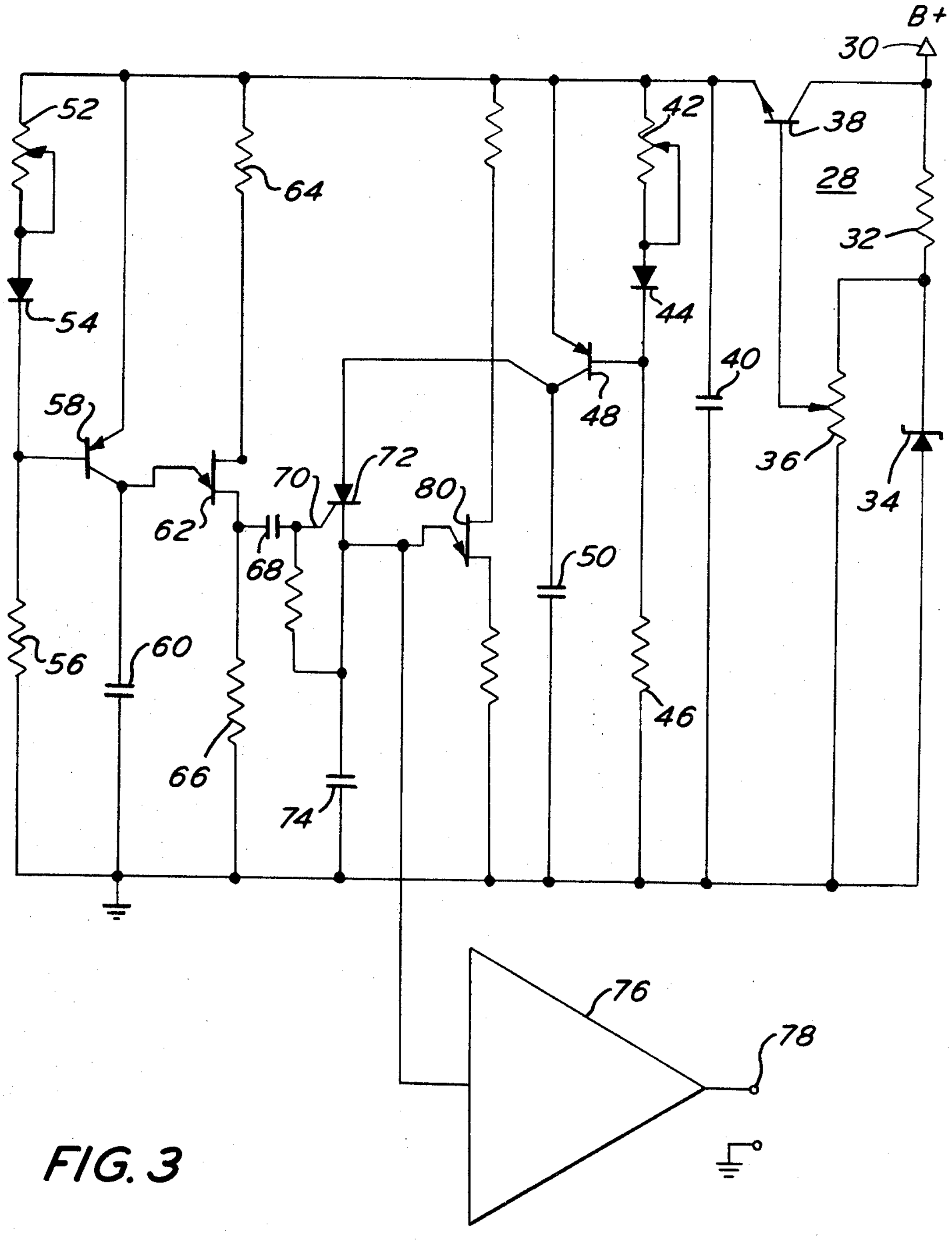
FIG. 3 is a schematic diagram of another embodiment in accordance with the present invention.

Referring now to FIG. 3, there is shown an embodiment of the invention for producing a staircase wave form 26 as shown in FIG. 2. There is shown a regulator 28 connected to a direct current power supply 30. Resistor 32, breakdown device 34 and potentiometer 36 provide an adjustable reference voltage to the base of transistor 38. Capacitor 40 provides filtering for the regulated voltage.

Rheostat 42, diode 44, resistor 46 and transistor 48 provide a constant current source for charging capacitor 50.

Similarly, rheostat 52, diode 54, resistor 56 and transistor 58 comprise a constant current source for charging capacitor 60. When capacitor 60 is charged to a predetermined voltage, the voltage across capacitor 60 fires unijunction transistor 62. Therefore, unijunction transitor 62, resistors 64 and 66, and capacitor 60 function as a relaxation oscillator. The voltage developed across resistor 66 is applied through capacitor 68 to trigger electrode 70 of controlled rectifier 72. The applying of a pulse to trigger electrode 70 of controlled rectifier 72 allows capacitor 50 to partially discharge through controlled rectifier 72 and charge capacitor 74. The voltage appearing across capacitor 74 is amplified by an amplifier 76 which then appears as the output voltage across output terminal 78 and ground. Unijunction transistor 80 is turned on when the voltage acoss capacitor 74 reaches a predetermined level. When unijunction transistor 80 is turned on, capacitor 74 is allowed to discharge thereby returning the output of the circuit to its initial condition.

In operation, regulator 28 provides a constant voltage to the remainder of the circuitry. Capacitor 50 is charged by the constant current caused to flow through transistor 48. Controlled rectifier 72 is fired periodically by the output of the relaxation oscillator comprised of unijunction transistor 62, capacitor 60 and resistors 64 and 66. Periodic firing of controlled rectifier 72 allows periodic partial discharge of capacitor 50. Each time controlled rectifier 72 is fired, capacitor 74 is charged to a higher voltage thereby forming another step of the staircase wave form 26 in FIG. 2. The voltage appearing across capacitor 74 is amplified by amplifier 76 to provide an amplified output across output terminal 78 and ground. Unijunction transistor 80 is fired when capacitor 74 is charged to the maximum desired output voltage.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for generating an output of a plurality of voltage levels, each successive voltage level being of an increased magnitude, comprising:

a first capacitor;

a constant current source for charging said first capacitor;

a second capacitor;

a silicon controlled rectifier having a first and a second electrode and a trigger electrode, said first and second electrodes of said silicon controlled rectifier being connected in series with said second capacitor, said series connected silicon controlled rectifier and second capacitor being connected across said first capacitor; and means for applying triggering pulses to said trigger electrode of said silicon controlled rectifier, said first capacitor partially discharging through said silicon controlled rectifier and said second capacitor.

2. Apparatus in accordance with claim 1 wherein said constant current source is adjustable to various predetermined currents.

3. Apparatus in accordance with claim 1 wherein said triggering means is a relaxation oscillator.

4. Apparatus in accordance with claim 1 wherein said triggering means applies triggering pulses to said trigger electrode periodically.

* * * * *